(12) United States Patent
Iversen et al.

(10) Patent No.: US 6,584,680 B2
(45) Date of Patent: Jul. 1, 2003

(54) TOOL FOR INSTALLING TURBINE GENERATOR STATOR WEDGES

(75) Inventors: Alan Michael Iversen, Clifton Park, NY (US); William Gene Newman, Scotia, NY (US); Kenneth John Hatley, Madison, NJ (US); Richard Michael Hatley, Madison, NJ (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/001,811

(22) Filed: Dec. 5, 2001

(65) Prior Publication Data

US 2002/0050063 A1 May 2, 2002

Related U.S. Application Data

(62) Division of application No. 09/699,814, filed on Oct. 30, 2000, now Pat. No. 6,421,914.

(51) Int. Cl.⁷ ................................................. B23P 19/00
(52) U.S. Cl. ............................. 29/732; 29/252; 29/256
(58) Field of Search ........................ 29/889.22, 889.21, 29/889, 596, 732, 822, 824, 252, 256, 270; 310/214, 254

(56) References Cited

U.S. PATENT DOCUMENTS

| 3,391,294 A | 7/1968 | Moxie et al. |
| 3,624,432 A | 11/1971 | Merz |
| 3,842,303 A | 10/1974 | Simmonds et al. |
| 3,909,931 A | 10/1975 | Lambrecht |
| 3,949,255 A | 4/1976 | Brown et al. |
| 4,149,101 A | 4/1979 | Lesokhin et al. |
| 4,200,818 A | 4/1980 | Ruffing et al. |
| 4,469,971 A | 9/1984 | Moore |
| 4,547,690 A | 10/1985 | Bath et al. |
| 4,572,980 A | 2/1986 | Anderson et al. |
| 4,584,497 A | 4/1986 | Butman, Jr. et al. |
| 4,607,183 A | 8/1986 | Rieber et al. |
| 4,633,574 A | 1/1987 | Bath et al. |
| 5,027,500 A | 7/1991 | Keck et al. |
| 5,075,959 A | 12/1991 | Keck et al. |

Primary Examiner—David P. Bryant
(74) Attorney, Agent, or Firm—Nixon & Vanderhye P.C.

(57) ABSTRACT

A process for installing a stator slide under a stator wedge in a radially oriented slot of a stator core assembly includes: a) loading windings in the radial slot, the radial slot having axially extending dovetail grooves in opposing sidewalls thereof; b) loading at least one stator wedge and stator slide in the dovetail grooves of the slot, and tightening the at least one stator wedge with the stator slide; c) loading at least one additional stator wedge in the dovetail grooves; d) locating at least one additional stator wedge slide relatively loosely under the additional stator wedge: and e) using the at least one stator wedge as a force reaction point, applying a force to the additional stator slide to drive the additional stator slide under the additional stator wedge. The tool for driving the stator slide under the stator wedge has a frame including a pair of elongated rail members; a force application cart located between the rail members, the force application cart having a force block thereon; a drive connected to the frame, substantially intermediate opposite ends of the frame; a lead screw threadably engaged at one end with the force application cart and connected at an opposite end to the drive such that the drive rotates the lead screw when actuated. Rotation of the lead screw causes axial movement of the force application cart and the force block against the slide in a tightening direction. A pin locates the tool relative to the stator slide, and establishes a reaction point for forces applied by the drive block to the stator slide.

5 Claims, 3 Drawing Sheets

TOOL FOR INSTALLING TURBINE GENERATOR STATOR WEDGES

This application is a division of application Ser. No. 09/699,814, filed Oct. 30, 2000, now U.S. Pat. No. 6,421,914, the entire content of which is hereby incorporated by reference in this application.

This application relates to turbomachinery and, in particular, to an air operated screw jack device for installing a tapered wedge slide under a tapered dovetail stator wedge in the stator core of a turbine generator.

BACKGROUND OF THE INVENTION

Magnetic stator cores for turbine generators typically include radially oriented slots that extend axially along the length of the core. Armature windings are seated within the slots and are held in place by a slot support system that includes tapered stator dovetail wedges and slides, various solid and conforming fillers, and a top ripple spring. These support components are employed in order to maintain the stator armature windings in a radially tight condition within the slots. The tapered dovetail wedges are received within axial dovetail slots on opposite side walls of the radial slots. During the process of tightening the stator wedges, it is necessary to install a complementary-shaped, tapered wedge slide against each stator wedge. For the sake of convenience, reference will be made herein to "stator wedges" that are seated in the dovetail slots and "stator slides" that are used to tighten the wedges. The stator slide is pre-gauged and pre-sized to have a significant interference fit relative to the slot contents, i.e., the windings, fillers and ripple springs. The force required to install the stator slide may be several thousand pounds.

Several methods have been used to provide force required to install the stator slides. For example, stator slides have been manually installed using a drive board and a large hammer, and using a modified pneumatically operated riveting gun. These methods, however, are time consuming and place considerable strain on the operator. They also subject the operator to the risk of repetitive motion injury and/or hearing damage, and pose a risk to the integrity of the stator core and armature windings.

BRIEF SUMMARY OF THE INVENTION

This invention provides a new stator slide driver device that provides a smooth, controlled, non-impacting stator slide assembly technique, with significant reduction or elimination of the aforementioned risks.

More specifically, this invention provides a stator slide driver tool that utilizes a predisposed hole in an adjacent already tightened stator wedge to provide the reaction point for the stator slide driving force. In one exemplary embodiment, a commercially available air wrench is utilized to drive a lead screw which, in turn, causes a force application cart to move axially in one of two directions, depending on the direction of rotation of the lead screw. The tool includes an adjustable pin, spaced axially from the cart and adapted to be received in a hole in the adjacent and already tightened stator wedge. In use, the cart is located so that an upstanding flange of a drive block abuts the rearward end of a stator slide loosely located under a stator wedge adjacent an already tightened stator wedge in which the pin is inserted. Actuation of the air wrench will cause the cart and its force application flange to drive the stator slide under the stator wedge, without repetitive impact, to thereby tighten the wedge, using the adjacent already tightened wedge as a force reaction point.

Accordingly, in one aspect, the present invention relates to a process for installing a tapered stator slide under a tapered dovetail stator wedge in a radial slot of a stator core assembly comprising:
 a) loading windings in the radial slot, the slot having axially extending dovetail grooves in opposing sidewalls thereof;
 b) loading at least one stator wedge in the dovetail grooves of the slot, and tightening the at least one stator wedge with said stator slide;
 c) loading at least one additional stator wedge in the dovetail grooves;
 d) locating at least one additional stator slide relatively loosely under the additional stator wedge; and
 e) using the at least one stator wedge as a reaction point applying a force to the additional stator slide to drive the additional stator slide under the additional stator wedge.

In another aspect, the invention relates to a tool for driving a stator slide under a stator wedge within a radial slot of a stator core comprising a frame including a pair of elongated rail members; a force application cart located between the rail members, the force application cart having a force block thereon; a drive connected to the frame, substantially intermediate opposite ends of the frame; a lead screw threadably engaged at one end with the force application cart and connected at an opposite end to the drive such that the drive rotates the lead screw when actuated, rotation of the lead screw causing axial movement of the force application cart and the force block; and a pin for locating the tool relative to the stator slide, and for establishing a reaction point for forces applied by the drive block.

DETAILED DESCRIPTION OF THE INVENTION

Figure 1:
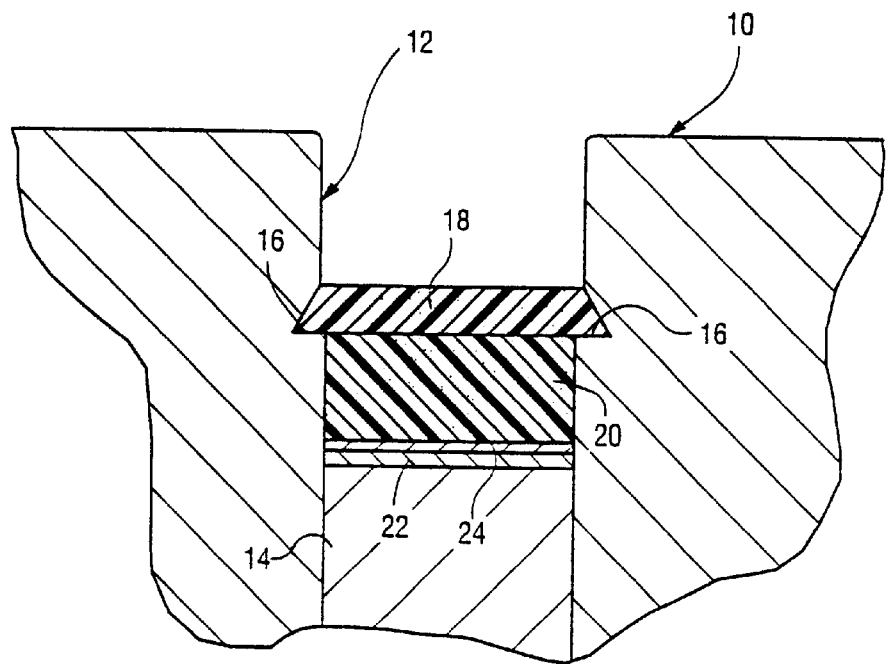
FIG. 1 is a partial axial section view of a stator core slot with conventional stator slide and stator dovetail wedge components in place.

Referring to FIG. 1, a magnetic stator core for a turbine generator is partially shown at 10. A plurality of radially oriented slots 12 extend axially along the stator, with armature windings 14 seated therein. Each slot 12 is formed adjacent its mouth with a dovetail groove or undercut 16 in opposed side walls of the slot, permitting several stator wedge and slide components 18, 20 to be inserted in an axial direction along the length of the slot. In this regard, the individual stator wedges and slides are generally between about 3 and 12 inches in length, and the stator core may have a length of between about 50 and 350 inches.

Figure 4:
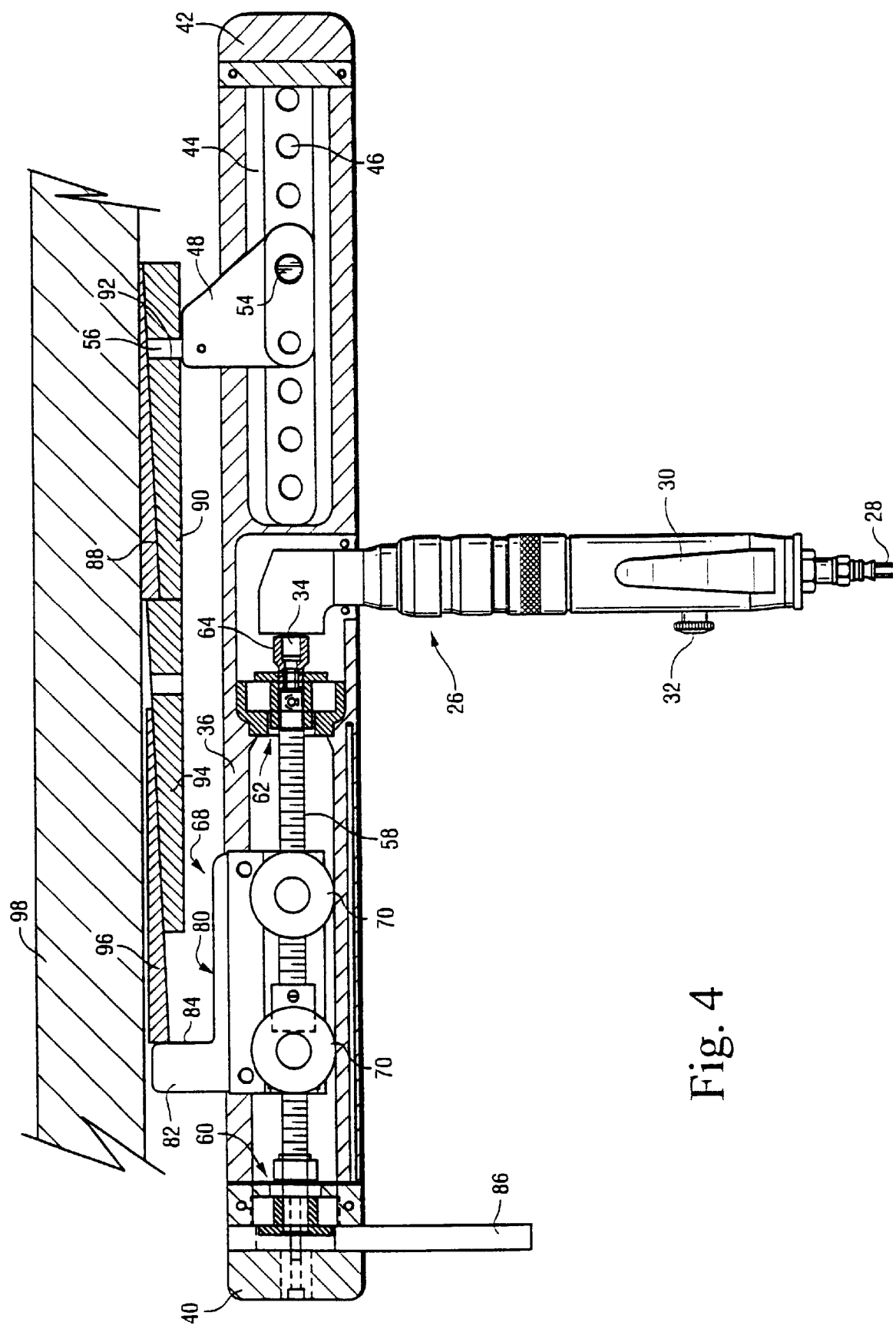
FIG. 4 is a side elevation illustrating the interaction between the wedge driver tool and stator wedge and slide components in accordance with an exemplary embodiment of the invention.

It will be understood that flat filler strips 22 and ripple springs 24 may be disposed between the windings and the stator wedges and slides as shown in FIG. 1, but these components have been omitted from FIG. 4 for the sake of clarity.

This invention relates to an air operated screw jack for installing the stator slide 20 under the mating stator wedge 18 to thereby apply radially inwardly directed forces on the windings 14 within the stator slot, and to a related method of tightening a stator wedge.

Figure 3:
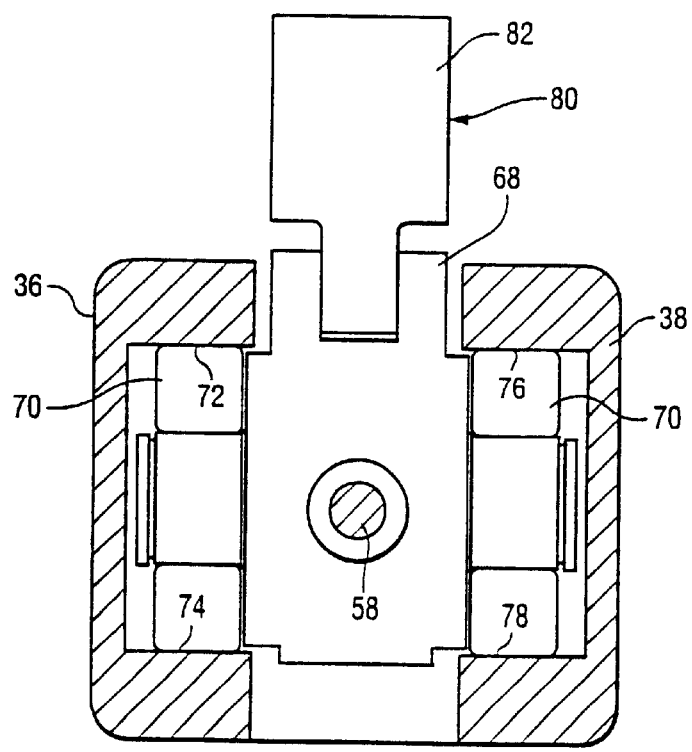
FIG. 3 is an end view of the wedge drive device shown in FIG. 2.
Figure 2:
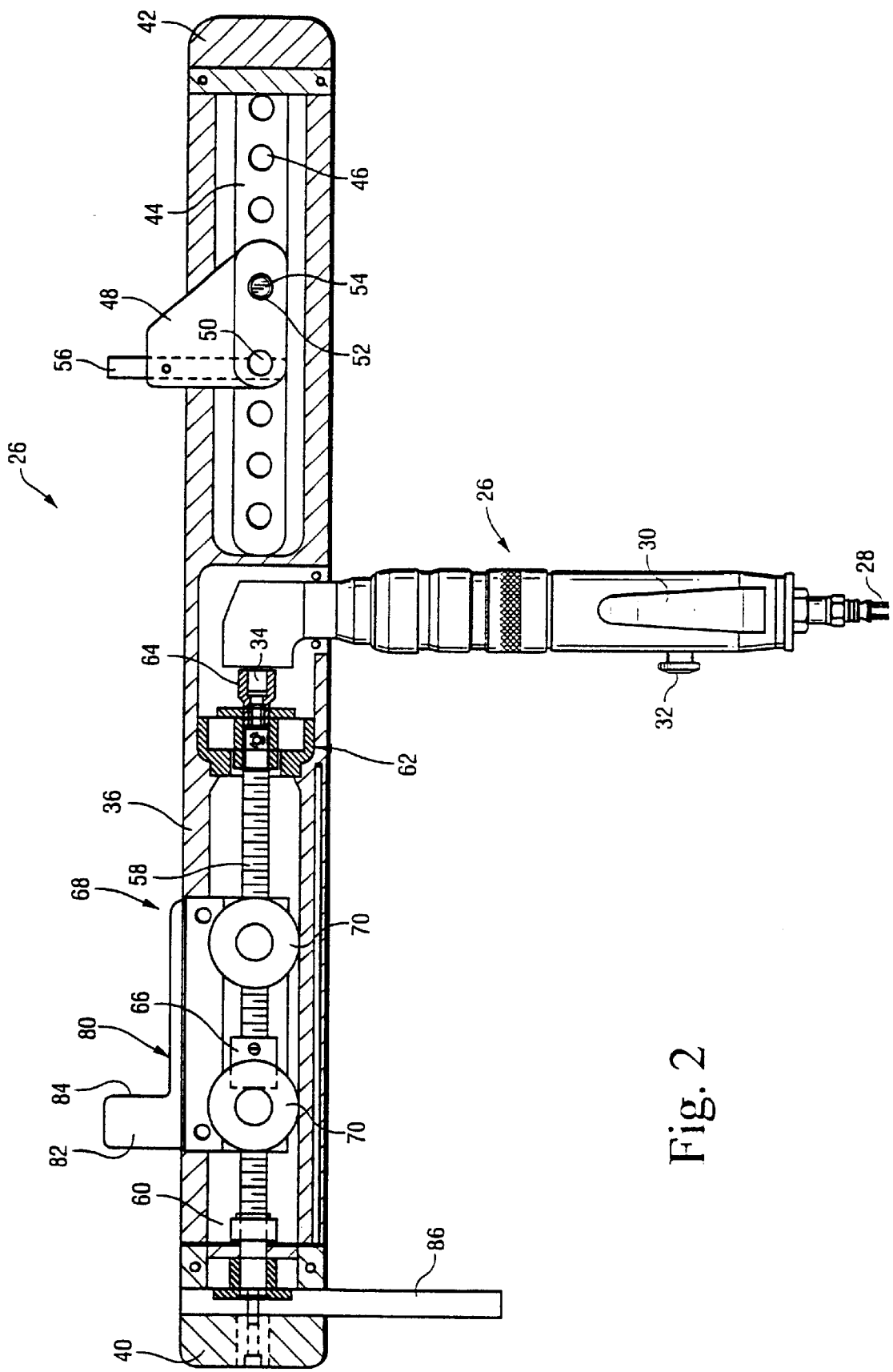
FIG. 2 is a side elevation of a wedge driving tool, with one side frame member removed, in accordance with an exemplary embodiment of the invention.

With reference now to FIGS. 2–4, the wedge slide driving tool 26 is a pneumatic tool that may be any suitable commercially available air powered wrench. The air wrench includes an air inlet 28, an actuator lever 30, a reverse button 32, and a rotatable hexagon head 34 oriented substantially perpendicularly to the body of the air wrench.

The air wrench is attached at its operative end to a pair of elongated side frame or rail members 36, 38 that are secured together at opposite ends by suitable fasteners and end caps 40, 42.

To one side of the wrench, a pin locator rail 44 is fixed between the side frame members 36, 38, the pin locator rail 44 having a plurality of locator holes 46 axially spaced along the length thereof. A pin block 48 is mounted for sliding movement along the rail 44, the pin block 48 having a pair of holes 50, 52 therein, but note that the axial spacing between the holes 50, 52 is not the same as the corresponding spacing between the locator holes 46 in the rail. As a result, only one of the two holes 50, 52 in the pin block 48 is alignable at any given time with any one of the holes 46 in the rail 44. This arrangement allows greater flexibility in adjusting the axial location of the pin block. When correctly located, a locking pin 54 is inserted into the aligned holes to thereby lock the pin block 48 relative to the frame members 36, 38. The pin block 48 is formed with a pin member 56 projecting from the top of the pin block. Adjustment of the pin block 48 allows the tool to be used with stator wedge and slide components of varying lengths.

On the other side of the air wrench, a lead screw 58 is fixed between a pair of thrust bearings 60, 62, the lead screw 58 having a conventional wrench socket 64 at one end thereof, adapted to fit onto the head 34 of the air wrench. The lead screw 58 is threadably engaged with a lead nut 66 fixed to a force application cart 68. The cart itself is provided with four wheels 70 by which the cart moves axially in opposite directions between the side rail members 36, 38. It will be appreciated that when the lead screw 58 is rotated, the cart will move along the lead screw in one of two opposite directions, depending on the direction of rotation of the lead screw, between opposed surfaces 72, 74 and 76, 78 of rails 36, 38, respectively, as best seen in FIG. 3.

A force application drive block 80 is secured to the drive cart. The drive block 80 is formed with an upstanding flange 82 having a vertical drive face 84 that is adapted to engage the face of a stator slide as described further below. The stator slide driver tool also includes a handle 86 which facilitates manipulation of the tool.

With reference to FIG. 4, the placement of stator wedge and slide components within the radially inner portion of a stator slot is illustrated with slot surfaces removed for the sake of clarity. Note that the slot orientation in FIG. 4 is 180° from that shown in FIG. 1. Specifically, a first stator wedge 88 and a first stator slide 90 are shown in a fully tightened position within the slot (there are also additional wedge and slide components inwardly, i.e., to the right, of those illustrated). It will be appreciated that the stator armature bars are thus tightly held within the radial core slots by means of the combined stator wedge and slide components, which extend axially along the length of the core slots. The various stator wedges each include a hole or aperture 92 adapted to receive the locating pin 56 of the stator slide driver tool 26. With this first pair of stator wedges and slides 88, 90 fully inserted and tightened, a second stator wedge 94 is loosely loaded into the stator core slot utilizing the integral dovetail grooves formed in the sidewalls of the slot. The stator slide 96 to be tightened is then loosely inserted between the stator wedge 94 and the windings generally shown at 98. Thereafter, the locating pin 54 of the stator slide driver tool 26 is inserted within the hole 92 in the already tightened stator wedge 90, and the force application cart 68 is located such that the vertical drive face 84 of the force application flange 82 abuts the axially outer face of the stator slide 96.

When the air wrench is actuated so as to rotate the lead screw 58 in the appropriate direction, the force application cart 68 will move axially in a tightening direction, such that the drive face 84 engages the outer face of the stator slide, driving it axially inwardly between the stator wedge 94 and the windings 98, with the locating pin 54 in the adjacent stator wedge 90 utilized as a force reaction point. The process is repeated for the remaining wedge and slide pairs to be inserted in the slot.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A tool for driving a stator slide under a stator wedge within a radial slot of a stator core comprising:

a frame including a pair of elongated rail members;

a force application cart located between said rail members, said force application cart having a drive block thereon;

a drive connected to said frame, substantially intermediate opposite ends of said frame;

a lead screw threadably engaged at one end with said force application cart and connected at an opposite end to said drive such that said drive rotates said lead screw when actuated, rotation of said lead screw causing axial movement of said force application cart and said drive block; and a pin for locating the tool relative to the stator slide, and for establishing a reaction point for forces applied by said drive block to said stator slide.

2. The tool of claim 1 wherein said drive comprises an air wrench connected to said lead screw.

3. The tool of claim 1 wherein said pin is adjustable relative to said frame.

4. The tool of claim 1 wherein said drive block is provided with a vertical drive face adapted to engage an edge of a stator slide.

5. The tool of claim 1 and further comprising thrust bearings forward and rearward of said force application cart.

* * * * *